(12) United States Patent
Rocci et al.

(10) Patent No.: US 10,939,982 B2
(45) Date of Patent: Mar. 9, 2021

(54) INTRAOSSEOUS DENTAL IMPLANT

(71) Applicant: ADVAN S.R.L., Amaro (IT)

(72) Inventors: Antonio Rocci, Chieti (IT); Luigi Baggi, Cassino (IT); Mauro Cavenago, Gorgonzola (IT)

(73) Assignee: ADVAN S.R.L., Amaro (IT)

( * ) Notice: Subject to any disclaimer, the term of this patent is extended or adjusted under 35 U.S.C. 154(b) by 0 days.

(21) Appl. No.: 16/624,508

(22) PCT Filed: Jun. 19, 2018

(86) PCT No.: PCT/IT2018/050111
§ 371 (c)(1),
(2) Date: Dec. 19, 2019

(87) PCT Pub. No.: WO2018/235119
PCT Pub. Date: Dec. 27, 2018

(65) Prior Publication Data
US 2020/0214807 A1 Jul. 9, 2020

(30) Foreign Application Priority Data

Jun. 19, 2017 (IT) .................. 102017000068034

(51) Int. Cl.
*A61C 8/00* (2006.01)
(52) U.S. Cl.
CPC ............ *A61C 8/0045* (2013.01); *A61C 8/006* (2013.01); *A61C 2008/0046* (2013.01)
(58) Field of Classification Search
CPC ......................................... A61C 8/0018–0045

USPC .................................................. 433/172–176
See application file for complete search history.

(56) References Cited

U.S. PATENT DOCUMENTS

| 5,795,160 | A | * | 8/1998 | Hahn | .................. | A61C 8/0022 |
| | | | | | | 433/174 |
| 6,203,324 | B1 | * | 3/2001 | Wils | ..................... | A61C 8/0022 |
| | | | | | | 433/173 |
| 10,357,338 | B2 | * | 7/2019 | Fromovich | .......... | A61C 8/0025 |
| 2004/0121289 | A1 | * | 6/2004 | Miller | .................. | A61C 8/0022 |
| | | | | | | 433/174 |
| 2004/0146834 | A1 | * | 7/2004 | Haessler | ............. | A61C 8/0089 |
| | | | | | | 433/174 |
| 2005/0214714 | A1 | * | 9/2005 | Wohrle | ................ | A61C 8/0077 |
| | | | | | | 433/173 |
| 2005/0250074 | A1 | * | 11/2005 | Lang | .................... | A61C 8/0089 |
| | | | | | | 433/174 |

(Continued)

FOREIGN PATENT DOCUMENTS

| DE | 2012002636 U1 | 4/2013 | | |
| EP | 1527749 A2 | * | 5/2005 | ........... A61C 8/0022 |

(Continued)

OTHER PUBLICATIONS

International Search Report for corresponding application PCT/IT2018/050111 filed Jun. 19, 2018; dated Jul. 29, 2018.

(Continued)

*Primary Examiner* — Matthew M Nelson
(74) *Attorney, Agent, or Firm* — Cantor Colburn LLP

(57) ABSTRACT

Intraosseous dental implant comprising a shaft (11) provided with a first end (12), a second end (13) opposite the first end (12), and at least one threading (14) made on the external surface of the shaft (11).

13 Claims, 2 Drawing Sheets

(56) References Cited

U.S. PATENT DOCUMENTS

| | | | |
|---|---|---|---|
| 2006/0199150 A1* | 9/2006 | Niznick | A61C 8/0022 |
| | | | 433/173 |
| 2006/0246397 A1* | 11/2006 | Wolf | A61C 8/0069 |
| | | | 433/173 |
| 2008/0160483 A1* | 7/2008 | Danger | A61C 8/0045 |
| | | | 433/174 |
| 2013/0252205 A1* | 9/2013 | Worthington | A61C 8/0048 |
| | | | 433/174 |
| 2015/0017605 A1* | 1/2015 | Su | A61C 8/0025 |
| | | | 433/174 |
| 2015/0030993 A1* | 1/2015 | von Malottki | A61C 8/0001 |
| | | | 433/173 |
| 2015/0086942 A1* | 3/2015 | Hwang | A61C 8/0075 |
| | | | 433/174 |
| 2017/0049539 A1* | 2/2017 | Jacoby | A61C 8/006 |
| 2019/0008614 A1* | 1/2019 | Weitzel | A61C 8/0024 |

FOREIGN PATENT DOCUMENTS

| | | | | |
|---|---|---|---|---|
| EP | 1527749 A2 | | 5/2005 | |
| GB | 2523828 A | * | 9/2015 | A61C 8/0025 |
| GB | 2523828 A | | 9/2015 | |
| KR | 20110122260 A | * | 11/2011 | |
| KR | 1020110122260 A | | 11/2011 | |
| WO | 2004103202 A1 | | 12/2004 | |
| WO | WO-2017090037 A1 | * | 6/2017 | A61C 8/0074 |

OTHER PUBLICATIONS

Written Opinion for corresponding application PCT/IT2018/050111 filed Jun. 19, 2018; dated Jul. 29, 2018.

* cited by examiner

INTRAOSSEOUS DENTAL IMPLANT

FIELD OF THE INVENTION

The present invention concerns a dental implant, for dental use, of an osteointegrable type and usable in the field of dental prostheses.

BACKGROUND OF THE INVENTION

Intraosseous dental implants are known, having substantially the shape of a screw to be fixed or anchored, by screwing, into a hole made in the bone part, that is, in the maxillary or mandibular bone, of a patient.

The dental implant, once in use, is associated with its accessories, for example with stumps, with prosthetic components or dedicated instruments, intended to restore the masticatory, aesthetic and phonetic function and the gnathological coordination of the patients, thus eliminating the need for traditional mobile prostheses.

Dental implants are usually made of a biocompatible metal material, for example titanium.

Normally, an intraosseous dental implant is defined by a shaft with a truncated cone shape with a single taper that develops along the longitudinal extension of the shaft. Possibly, one of the ends of the shaft can be shaped as a tip to facilitate insertion and screwing of the implant into the bone.

The other end, opposite the tip, can instead be provided with attachment portions, for example threaded holes or housing seatings, provided to allow the connection of a stump.

The shaft is provided, on its external surface, with a thread that extends from the tip toward the other end and allows it to be screwed into the bone part of a patient.

Some examples of dental implants are also known from the documents DE-U-20.2012.002.636, GB-A-2523828 and WO-A-2004/103202.

In particular, DE-U-20.2012.002.636 describes a dental implant comprising a shaft having a first portion and a second portion between which an intermediate or discharge portion is interposed. The first portion extends from a first end of the shaft, having a pointed conformation, toward the intermediate portion. The second portion extends from a second end of the shaft, opposite the first end, and is provided with a connection portion, for example for a stump.

The first portion and the second portion are each provided with a different threading, while the intermediate portion has no threading and a substantially cylindrical shape.

The first portion and the second portion each have a conical conformation, the tapers of which, however, are not made in continuity with each other and are interrupted by the intermediate portion. More specifically, the larger section of the first portion is larger than the smaller section of the second portion. This determines a reduction in the gripping capacity of the implant since, when the latter is inserted into the bone part, the first portion which is inserted first erodes part of the bone and jeopardizes the subsequent anchorage of the second portion.

In GB-A-2523828 a dental implant is described comprising a shaft having a first portion and a second portion, aligned along the same axis and both having a conical conformation. In particular, the first portion, which has an end conformed as a tip, has an angle of taper greater than the taper of the second portion. During the installation of the implant, in common practice, a first hole is made with a depth suitable to receive the entire intraosseous implant and with a diameter substantially equal to the average diameter of the first portion. Subsequently, a second hole is made in the same first hole, with a depth smaller than that of the first hole, and suitable to accommodate only the second portion. The second hole has a diameter substantially equal to the maximum core diameter of the second portion. This manufacturing procedure, as well as the particular conformation of the implant, entail that an unstable anchorage is obtained in the bone part, since the conical portions do not have a uniform grip along their whole axial extension because of the differences in coupling between the hole which has a cylindrical conformation and the different portions of the implant that have a conical conformation.

WO-A-2004/103202 describes a dental implant provided with a tip or apical end and a coronal end. The implant is also provided with a threading that extends along the axis of the implant with threads that are distanced from each other toward the apical end and gradually become denser and denser toward the coronal end. The core diameters provided on the bottom of each thread have a conical profile with substantially equal tapers but with sizes that are gradually reduced as they move along the axis.

This conformation of the implant is also particularly unstable during installation as it cannot provide sufficient grip during use.

Therefore, one of the disadvantages of known dental implants is the precarious anchorage to the bone part of the patient, which the shaft described above does not always guarantee in a safe and lasting manner over time.

The precarious anchorage is even more pronounced when the conditions of the patient's bone part are not optimal.

In fact, it is not rare that, due to a badly or improperly anchored dental implant, a dental prosthesis must be removed and replaced, with consequent physical and economic damage for the patient.

Furthermore, once a dental implant has been installed, normally the waiting time to achieve a sufficiently stable anchorage, that is, the osseointegration time of the implant, is excessively long.

Indeed it is known that after attaching the implant to the patient's bone part it is necessary to wait until the latter has stabilized, or has become osseointegrated, before being able to associate, for example, the stump with it.

One purpose of the present invention is to provide a dental implant which has a stable attachment, or anchorage, to the patient's bone part, greater than known solutions.

It is also a purpose of the present invention to provide a dental implant able to reduce osseointegration times compared with known solutions.

It is also a purpose of the present invention to provide a dental implant which has a high stability and durability over time.

Another purpose of the present invention is to provide a dental implant which is simple and inexpensive to make.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, the present invention concerns an intraosseous dental implant comprising a shaft provided with a first end, or apical end, and a second end, or coronal end, opposite the apical end, and at least one threading made on the external surface of the shaft.

The shaft is defined by a first portion, or apical portion, which extends from the apical end toward the inside of the shaft, and by at least a second portion, or coronal portion, which extends from the apical portion toward the coronal end. The apical portion and the coronal portion each have a truncated cone shape with different angles of taper from each other, and said threading is provided on the apical portion and on at least part of the coronal portion.

In accordance with another aspect of the invention, between the first portion and the second portion there is a shoulder that defines a discontinuity of the connection diameters between the first portion and the second portion. The first portion, in the connection zone with the second portion, has a first diameter, while the second portion, in the connection zone with the first portion, has a second diameter, bigger than the first diameter, in this way defining the shoulder between the first portion and the second portion.

The threading comprises a first portion of threading provided in the first portion, and a second portion of threading provided in the second portion.

The first portion of threading has a constant height of the crests of the threads, while the height of the threads of the second portion of threading is greater in correspondence with the connection zone between the first portion and the second portion, and decreases as it moves toward the second end.

The difference in taper between the apical portion and the coronal portion, as well as the particular conformation of the first portion and second portion of threading, allow to increase the gripping action, that is, the gripping/adhesion that the implant manages to exert on the part of the bone when it is screwed in.

In fact, during screwing, torsion tensions occur in the shaft which, unlike the known solutions, are no longer concentrated only in correspondence with the apical end.

With the solution of the present invention, in fact, during the screwing, a first torsion tension is absorbed by the apical end of the shaft while a second torsion tension is absorbed by the transition zone between the apical portion and the coronal portion, that is, in the zone where the shoulder is provided.

This redistribution of the torsion tensions, which are distributed along the entire longitudinal development of the shaft, and consequently also on the bone part, allow to increase the action of adhesion or gripping that can be maintained over time, ensuring stability and durability over time, even when the implant is subjected to stresses, for example when chewing.

Moreover, the possibility of distributing the tensions evenly along the shaft allows to increase the screwing torque that can be exerted on the screw to allow screwing, providing further stability to the implant.

The above is also justified by the fact that during the installation of the implant according to the present invention, two overlapping circular holes of different diameters are made in the patient's bone part, that is, a first hole with a length substantially equal to that of the implant and a diameter suitable to allow the first portion to be screwed in, and a second hole, shorter in length than the first hole and a larger diameter, in which the second portion of the implant is positioned. In the transition zone between the first hole and the second hole, a shoulder is made on which the shoulder of the implant is positioned and supported.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
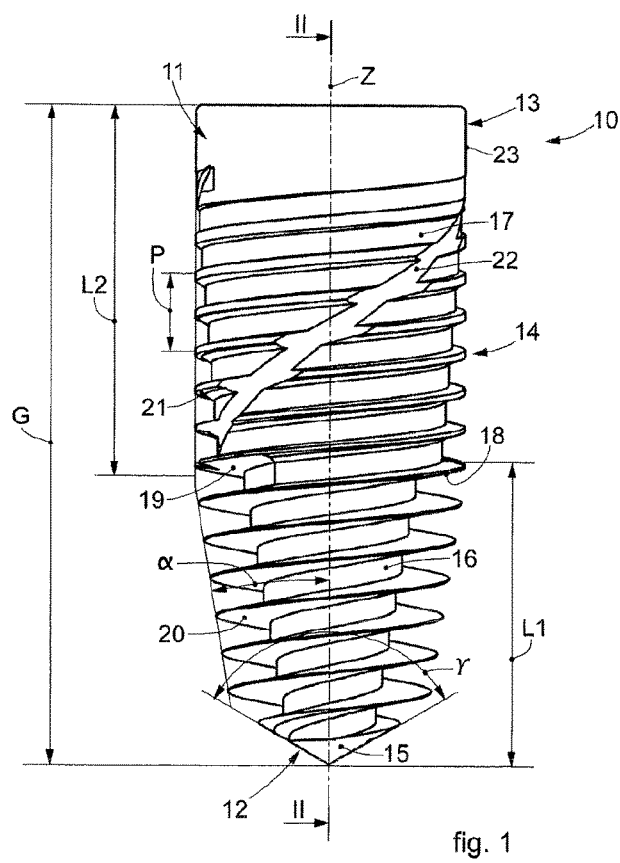
FIG. 1 is a front view of a dental implant according to the present invention.
Figure 2:
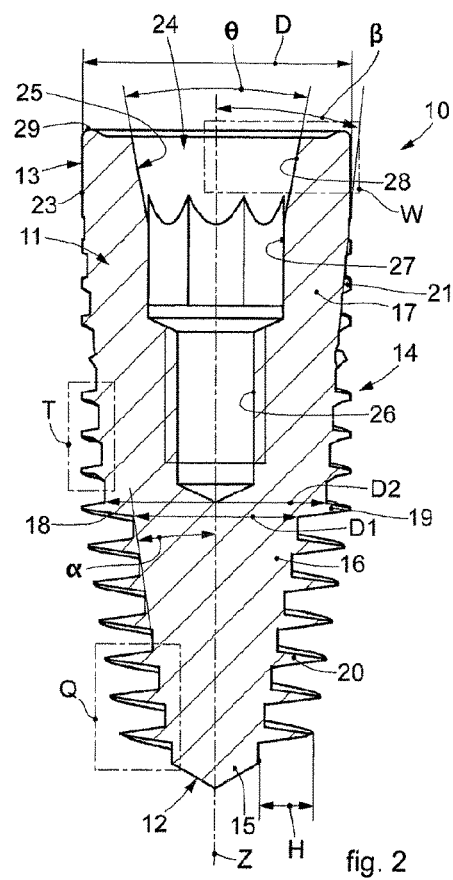
FIG. 2 is a longitudinal section view along the section line II-II of FIG. 1.
Figure 3:
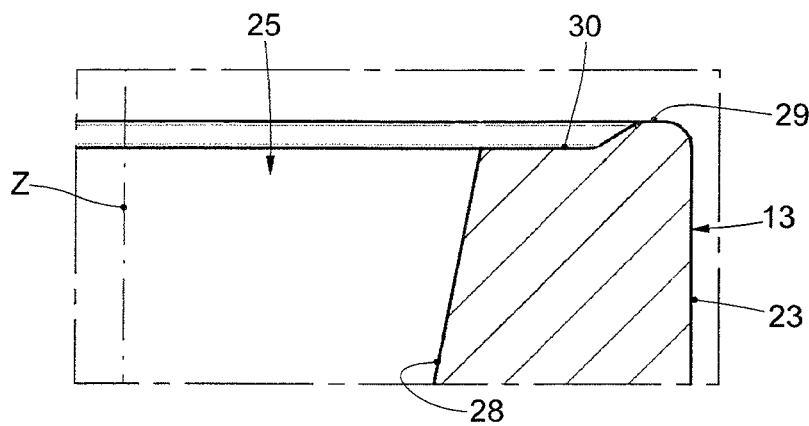
FIG. 3 is an enlarged view of the detail W of FIG. 2.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Embodiments described here using FIGS. 1-5 concern a dental implant 10, for dental use, comprising a shaft 11.

The shaft 11 can be made of biocompatible metal material, for example titanium.

The shaft 11 has an oblong development along a longitudinal axis Z.

The shaft 11 has an axial-symmetric shape to allow it to be screwed in.

The shaft 11 can have a length G which, by way of example only, can be comprised between 5 mm and 25 mm, preferably between 6 mm and 21 mm.

The shaft 11 is provided with a first end 12, hereafter also called apical end, and a second end 13, hereafter also called coronal end, which is opposite the apical end 12.

Moreover, the shaft 11 is provided on its external surface with at least one threading 14 which extends for at least part of the length of the shaft 11, as described hereafter.

In practice the shaft 11 defines the core diameter of the threading 14. From the shaft 11, therefore, the ridges of the threads of the threading 14 protrude, which is made in a single body with the shaft 11.

The threading 14 can have a single start threading.

It is not excluded that in possible solutions the threading 14 has two, as shown in FIG. 1, or more threading starts, in order to confer greater gripping stability of the implant once installed.

According to a possible embodiment, the threading 14 has a constant pitch P along its entire development. In the case of a threading 14 with several starts, the pitch P of each of the starts are equal to each other.

By way of example only, the pitch P of the threading 14 can be between 0.8 mm and 1.5 mm.

The apical end 12 can have, in its end part, a tip portion 15 suitable to facilitate the insertion and screwing of the shaft 11 into the bone part of a patient.

The threading 14 extends from the tip portion 15 and extends toward the coronal end 13.

The tip portion 15 can have, by way of example only, a conical shape, with an angle of aperture of the cone y which, by way of example only, can be comprised between 100° and 130°. This range of values allows to give the tip portion 15 sufficient resistance to the stresses to which it will be subjected during use.

The tip portion 15 can have a length comprised between about 0.5 mm and about 2 mm, preferably between about 0.5 mm and about 1.5 mm.

According to one aspect of the present invention, the shaft 11 is defined by a first portion 16, also referred to hereafter as apical portion, which extends from the apical end 12 toward the inside of the shaft 11, and by at least a second portion 17, hereafter also called coronal portion, which extends from the apical portion 16 toward the coronal end 13.

In some embodiments, the apical portion 16 has a length L1 which is comprised between 55% and 80% of the length G of the shaft 11.

In other embodiments, the coronal portion 17 has a length L2 which is comprised between 20% and 45% of the length G of the shaft 11.

The apical portion 16 and the coronal portion 17 each have a truncated cone shape, in which the taper of the apical portion 16 is different from the taper of the coronal portion 17.

Moreover, the threading 14 extends continuously from the apical end 12 into at least part of the coronal portion 17.

In particular, the apical portion 16 has a first taper angle $\alpha$ while the coronal portion 17 has a second taper angle $\beta$, with a width smaller than that of the first taper angle $\alpha$.

In particular, the apical portion 16 has a taper which opens, that is, widens from the apical end 12 toward the inside of the shaft 11, while the coronal portion 17 has a taper which opens from the connection zone with the coronal portion 17 toward the coronal end 13.

This characteristic allows to equally distribute the torsion stresses which arise during the screwing of the shaft 11, both in the apical portion 16 and also in the coronal portion 17.

Moreover, the difference in the taper also allows to obtain a threading 14 with a depth of the crests of the thread differentiated between the apical portion 16 and the coronal portion 17, as described below. This characteristic allows to increase the action of adhesion of the threading 14 on the bone part, distributing the screwing stresses thereof.

The tapers of the apical portion 16 and of the coronal portion 17 are determined with respect to the longitudinal axis Z, that is, they are defined by the angle comprised between the apothem of the truncated cone and the longitudinal axis Z.

According to one embodiment, the first taper angle $\alpha$ is between about 5° and about 15°, preferably between 5° and 10°.

According to a possible embodiment, the second taper angle $\beta$ is comprised between about 1° and about 10°, preferably between 1.5° and 6°.

According to possible solutions, between the apical portion 16 and the coronal portion 17 there is a shoulder 18 which defines a discontinuity of the connection diameters between the apical portion 16 and the coronal portion 17.

In particular, it can be provided that the apical portion 16, in the connection zone with the coronal portion 17, has a first diameter D1 of its core, and that the coronal portion 17, in the connection zone with the apical portion 16, has a second diameter D2 of its core, greater than the first diameter D1 defined above.

By way of example only, the ratio between the first diameter D1 and the second diameter D2 can be comprised between 0.5 and 0.9, preferably between 0.6 and 0.8.

According to possible solutions, the shoulder 18 is located in direct continuity with the apical portion 16 and the coronal portion 17.

In accordance with a possible solution of the present invention, the shoulder 18 can be defined by at least part of a thread 19 of the threading 14. This configuration allows to define a continuity of the threading 14 between the apical portion 16 and the coronal portion 17, and therefore allows to have screwing continuity between the apical portion 16 and the coronal portion 17.

In the case of a threading 14 with several starts, the shoulder 18 can be defined by several parts of thread 19 of each start of threading 14.

Moreover, the at least one part of thread 19 makes it possible to increase the resistance to stresses of the zone comprised between the apical portion 16 and the coronal portion 17. This allows to increase the clamping torque of the dental implant 10 to the bone of the patient.

In accordance with a possible solution, the part of thread 19 defines a helical inclined plane with an angular amplitude of less than a round angle, merely by way of example comprised between 270° and 340°. This allows to increase the anchoring action of the implant and prevents the stresses which the coronal portion 17 has to bear from being transmitted also toward the apical portion 16. In this way a homogeneous distribution of stresses is obtained.

In accordance with possible solutions, the threading 14 comprises a first threading portion 20 which is provided in the apical portion 16 and a second threading portion 21 which is provided in the coronal portion 17.

The first threading portion 20 and the second threading portion 21 can comprise one or more threading starts as defined above.

The first threading portion 20 and the second threading portion 21 can each have at least two threading pitches along their longitudinal extension.

According to a possible solution, the first threading portion 20, provided in the apical portion 16, has an external diameter which is variable in a conical manner along the longitudinal extension of the apical portion 16.

The taper angle of the first threading portion 20 can be substantially the same as the first taper angle $\alpha$.

According to this embodiment, the height of the crests of the threads, which protrude from the apical portion 16, of the first threading portion 20, is constant. In this way the apex has a spiral with a conical profile which facilitates the insertion of the dental implant 10. Furthermore, the first threading portion 20 thus obtained accentuates the self-threading effect of the dental implant 10 itself.

In accordance with possible solutions, the threads of the first threading portion 20 have a height H between comprised 0.8 mm and 1.2 mm.

In accordance with possible embodiments (FIG. 5), the threads of the first threading portion 20 have a triangular cross-section which allows to have less connected and sharper apexes, to guarantee the stability of the anchorage of the dental implant 10 also in depth, that is, where the dental implant 10 is subjected to greater stress.

The triangular profiles of the threads of the first threading portion 20 can have an angle at the vertex E which is comprised between about 10° and about 40°.

According to a possible solution, the second threading portion 21 has an external diameter which is substantially constant along the longitudinal extension of the coronal portion 17.

In this way, since the coronal portion 17 has a truncated cone shape, the height of the threads of the second threading portion 21 is greater in correspondence with the connection zone between the apical portion 16 and the coronal portion 17 and decreases as it moves toward the coronal end 13. In this way, the spiral is progressive, guaranteeing a better distribution of the occlusal load when the dental implant 10 is osseointegrated.

Figure 4:
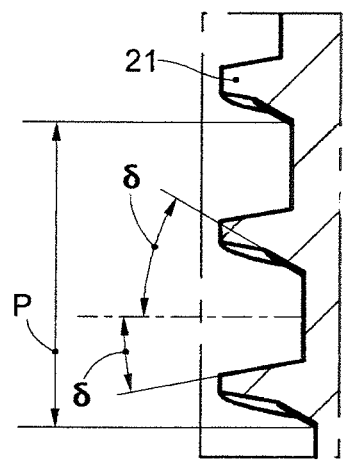
FIG. 4 is an enlarged view of the detail T of FIG. 2.
Figure 5:
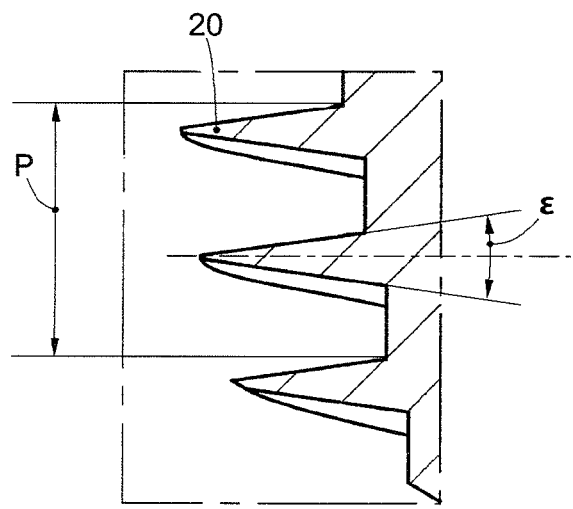
FIG. 5 is an enlarged view of the detail Q of FIG. 2.

In accordance with a possible solution, shown in FIG. 4, the threads of the second threading portion 21 can have a trapezoidal cross section.

The trapezoidal shape allows to transfer the anchoring action of the dental implant 10 deep into the bone part.

The sides of the trapezium defining the sides of the thread are inclined with respect to an axis orthogonal to the longitudinal axis Z by an angle δ comprised between about 20° and about 40°.

According to a possible solution, the first threading portion 20 and the second threading portion 21, in the connection zone between the apical portion 16 and the coronal portion 17, have the same external diameters. The first threading portion 20 and the second threading portion 21 therefore develop continuously, that is, without sudden variations in the external diameters, along the longitudinal extension of the shaft 11.

On the external surface of the shaft 11, at least one groove 22 (FIG. 1) is made in the threading 14, which develops transversely to the development of the threads of the threading 14 and defines a discharge channel for the discharge of liquids or solid parts which are generated during the screwing of the shaft 11.

The groove 22 can have a spiral development with a pitch of the helix greater than that of the threading 14, for example equal to or greater than 5 times the pitch P of the threading 14.

According to possible solutions, the coronal portion 17 is provided with a cylindrical zone 23 located in correspondence with the coronal end 13 and without the threading 14.

The cylindrical zone 23 can have a diameter D comprised between 3 mm and 6 mm.

The cylindrical zone 23 is then followed by the truncated cone shape defined above for the coronal portion 17.

According to possible solutions, the coronal portion 17 is provided, in correspondence with the coronal end 13, with connection elements 24 (FIG. 2) configured to allow the connection of accessory elements of the dental implant 10, for example to allow the connection of a prosthetic stump, also called abutment, and not shown in the drawings, or of a prosthesis.

According to possible solutions, the connection elements 24 comprise a connection seating 25 which extends substantially parallel to the longitudinal axis Z.

The connection seating 25 is made open toward the coronal end 13 and develops toward the inside of the shaft 11.

The connection seating 25 is provided with at least a threaded portion 26 configured to allow the screwing, for example with threaded elements, of the abutment.

The connection seating 25 is also provided with a positioning portion 27 having a polygonal cross section shape, for example octagonal, or hexagonal.

The positioning portion 27 allows both to act with screwing tools on the shaft 11 to provide for the screwing of the latter, and also allows to position the abutment according to a very precise angular position with respect to the longitudinal axis Z.

In particular, the stump can also be provided with a mating positioning portion configured to be inserted in the positioning portion 27 of the connection seating 25.

The positioning portion 27 is particularly effective when inclined stumps are used.

The connection seating 25 can be provided with a truncated cone portion 28 located between the positioning portion 27 and the coronal end 13 and configured to allow to position the stump.

The truncated cone portion 28 can have a taper angle θ comprised between 10° and 25°.

The threaded portion 26 is disposed in a more internal position with respect to the positioning portion 27 and to the truncated cone portion 28, and the positioning portion 27 is interposed between the threaded portion 26 and the truncated cone portion 28.

According to another aspect of the present invention, the coronal end 13 has an end surface 29 which is substantially flat and is disposed orthogonal to the longitudinal axis Z.

An annular recess 30, located recessed in the thickness of the shaft 11, is made in the end surface 29.

The annular recess 30 is coaxial with the longitudinal axis Z and with the connection seating 25.

The annular recess 30 can have a thickness comprised between 0.2 mm and 1 mm.

The annular recess 30 allows to increase the surface available for regeneration of the bone and/or of the tissue by about 30%.

The annular recess 30 generates a free space in proximity to the connection which is filled by a coagulum so as to recreate a reshaped bone tissue and not a fibrous tissue or connective gingival tissue, as shown, for example, by histologies of implants positioned juxta-crestal in the upper jaw.

It is clear that modifications and/or additions of parts can be made to the dental implant 10 as described heretofore, without departing from the field and scope of the present invention.

By way of example, it can be provided that the transition zone between the apical portion 16 and the coronal portion 17 does not have the shoulder 18, for example by providing that, in the connection zone between the apical portion 16 and the coronal portion 17, the maximum diameter of the apical portion 16 corresponds with the minimum diameter of the coronal portion 17.

It is also clear that, although the present invention has been described with reference to some specific examples, a person of skill in the art shall certainly be able to achieve many other equivalent forms of dental implant 10, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Intraosseous dental implant comprising a shaft provided with a first end, a second end opposite the first end, and at least one threading made on the external surface of said shaft, wherein said shaft is defined by a first portion which extends from the first end toward the inside of said shaft, and by at least a second portion which extends from the first portion toward the second end, said first portion and said second portion each having a truncated cone shape with different angles of taper from each other, and said threading being provided on the first portion and on at least part of the second portion, wherein between said first portion and said second portion there is a shoulder that defines a discontinuity of the connection diameters between said first portion and said second portion, wherein said first portion, in the connection zone with said second portion, has a first diameter, wherein said second portion, in said connection zone with said first portion, has a second diameter, bigger than said first diameter, wherein said threading comprises a first portion of threading provided in said first portion, and a second portion of threading provided in said second portion, wherein said first portion of threading has a constant height of the crests of the threads, and wherein the height of the threads of said second portion of threading is greater in correspondence with said connection zone between said first portion and said second portion, and decreases as it moves toward said second end.

2. Dental implant as in claim 1, wherein said shoulder is defined by at least part of a thread of said threading.

3. Dental implant as in claim 2, wherein said part of a thread defines a helicoidal inclined plane with an angular amplitude less than a round angle.

4. Dental implant as in claim 1, wherein said first portion has a first taper angle and said second portion has a second taper angle, which has an amplitude smaller than that of said first taper angle.

5. Dental implant as in claim 4, wherein said first taper angle is comprised between 5° and 15°, and said second taper angle is comprised between 1° and 10°.

6. Dental implant as in claim 1, wherein said threading extends continuously from said first end into at least part of said second portion.

7. Dental implant as in claim 1, wherein the first portion of threading and the second portion of threading, in the connection zone between the first portion and the second portion, have the same external diameters.

8. Dental implant as in claim 7, wherein the threads of said first portion of threading have a triangular cross section, and wherein the threads of said second portion of threading have a cross section with a trapezoid shape.

9. Dental implant as claim 1, wherein said first portion has a length which is comprised between 55% and 80% of the length of said shaft, and wherein said second portion has a length comprised between 20% and 45% of the length of said shaft.

10. Dental implant as in claim 1, wherein said second portion is provided, in correspondence with said second end, with connection elements configured to allow the connection of accessory elements.

11. Dental implant as in claim 1, wherein the threading has a constant pitch along its entire development.

12. Dental implant as in claim 1, wherein the second portion of threading has an external diameter that is substantially constant along the longitudinal extension of the coronal portion.

13. Dental implant as in claim 1, wherein in the threading at least one groove is made that develops transversely to the development of the threads of the threading and defines a discharge channel.

* * * * *